US012330177B2

(12) United States Patent
Mittnacht et al.

(10) Patent No.: US 12,330,177 B2
(45) Date of Patent: Jun. 17, 2025

(54) DOSING DEVICE AND METHOD OF DOSING LIQUID MEDIA

(71) Applicant: BUERKERT WERKE GMBH & CO. KG, Ingelfingen (DE)

(72) Inventors: Fabian Mittnacht, Ingelfingen (DE); Nathalie Kettemann, Ingelfingen (DE); Matthias Boehringer, Ingelfingen (DE); Patrick Mohs, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 429 days.

(21) Appl. No.: 17/718,997

(22) Filed: Apr. 12, 2022

(65) Prior Publication Data

US 2022/0323982 A1 Oct. 13, 2022

(30) Foreign Application Priority Data

Apr. 12, 2021 (DE) ......................... 102021109076.8

(51) Int. Cl.
*B05B 12/08* (2006.01)
*B05B 12/02* (2006.01)

(52) U.S. Cl.
CPC ............ *B05B 12/087* (2013.01); *B05B 12/02* (2013.01)

(58) Field of Classification Search
CPC ..... B05B 12/087; B05B 12/02; B01L 3/0275; B01L 2400/0487; B01L 3/0293; G01F 1/36; G01F 15/00; G01F 15/18
See application file for complete search history.

(56) References Cited

U.S. PATENT DOCUMENTS 7,413,710 B2 * 8/2008 Lisec .................... B01L 3/0241 422/417
2010/0072301 A1 3/2010 Cater
(Continued)

FOREIGN PATENT DOCUMENTS

DE 102008060815 B3 4/2010
DE 102008053411 A1 5/2010
(Continued)

OTHER PUBLICATIONS

English Translation of RU 2506583 (Year: 2014).*

*Primary Examiner* — Qingzhang Zhou
(74) *Attorney, Agent, or Firm* — McNees Wallace & Nurick LLC

(57) ABSTRACT

A dosing device has a dosing tip for dispensing liquid medium and at least one pressure vessel with a pressurizing gas, in which an overpressure or a negative pressure can be set as a predefined pressure setpoint value of an internal pressure by a pressure regulator, wherein the internal pressure is set by the pressurizing gas acting on a first liquid medium. A bidirectional flow meter is provided to measure a quantity of the first medium that is moved by the internal pressure prevailing in the pressure vessel. Furthermore, a dosing valve is provided upstream of the dosing tip, which is adapted to enable or disable a flow of the first medium from the flow meter to the dosing tip. For precise dosing, the first medium is moved by a change in the predefined pressure setpoint value of the internal pressure of at least one pressure vessel, and the moved quantity of the first medium is measured by the flow meter.

12 Claims, 7 Drawing Sheets

(56) References Cited

U.S. PATENT DOCUMENTS

| | | | |
|---|---|---|---|
| 2013/0064738 | A1 | 3/2013 | Berger et al. |
| 2019/0083982 | A1 | 3/2019 | Wunderlich et al. |

FOREIGN PATENT DOCUMENTS

| | | | | | |
|---|---|---|---|---|---|
| DE | 102012000899 | B4 | | 1/2014 | |
| DE | 102017216713 | A1 | | 3/2019 | |
| DE | 102018206078 | A1 | | 10/2019 | |
| DE | 102020110201 | A1 | | 10/2021 | |
| RU | 2506583 | C2 | * | 2/2014 | ............... G01F 1/36 |
| WO | WO-2009080352 | A1 | * | 7/2009 | ............... G01F 1/26 |
| WO | 2011101479 | A1 | | 8/2011 | |

* cited by examiner

DOSING DEVICE AND METHOD OF DOSING LIQUID MEDIA

FIELD OF THE INVENTION

The invention relates to a dosing device and a method of dosing liquid media.

BACKGROUND

Dosing devices for dispensing very small quantities of liquid in the range of about 1 μl to 50 μl require that quantities of liquid be delivered very precisely.

Since such dosing devices are often used in the pharmaceutical industry, for example in diagnostics, or also in the food sector, where it is extremely important to avoid contamination of the dosed liquids with other substances, it has to be ensured that the liquids used do not come into contact with other media or components of the dosing device that might transfer contamination.

For this reason, disposable parts are often employed, for example diaphragm pumps for liquid transport having dosing tips for precise intake (aspirating) and precise delivery (dispensing) of the individual media.

This generates a large amount of plastic waste, which is disadvantageous in terms of environmental protection.

It is an object to provide a dosing system in which waste can be reduced and which offers a high degree of flexibility with regard to the dosing quantities while providing a high degree of precision.

SUMMARY

A dosing device according to the invention has a dosing tip for dispensing liquid medium and having at least one pressure vessel with a pressurizing gas, in which an internal pressure can be set by a pressure regulator to a predefined pressure setpoint value, which is an overpressure or a negative pressure relative to an environment of the dosing device, the internal pressure set by means of the pressurizing gas acting on a first liquid medium. Further provided are a bidirectional flow meter that is designed to measure a quantity of the first medium that is moved by the internal pressure prevailing in the pressure vessel, and a dosing valve located upstream of the dosing tip and designed to enable or to disable a flow of the first medium from the flow meter to the dosing tip.

The dosing device is designed to be able to move the first medium in both directions, i.e. in the direction towards the dosing tip and in the direction away from the dosing tip by selecting the predefined pressure setpoint value from a predefined value range that extends from a negative pressure to an overpressure. The pressurizing gas presses the first medium in the direction towards the dosing tip when there is an overpressure in the pressure vessel relative to the environment of the dosing device, and the first medium is sucked away from the dosing tip in the direction towards the pressure vessel when there is a negative pressure in the pressure vessel relative to the environment of the dosing device. Thus, it is possible to respectively aspirate and disperse medium by setting the internal pressure level in the pressure vessel as an overpressure or a negative pressure, depending on the situation.

The first medium is basically moved through the conduits of the dosing device purely by pressure differentials, which are based on an overpressure or a negative pressure within the pressure vessel relative to the environment, so that a pump between the pressure vessel and the dosing tip can be dispensed with.

The predefined pressure setpoint value of the internal pressure and thus also the internal pressure inside the pressure vessel are e.g. constant during a dosing process, that is, while medium is moved in the conduits of the dosing device. During the entire dosing process, therefore a constant pressure differential exists between the internal pressure within the pressure vessel and an ambient pressure outside the dosing tip. The setting of the internal pressure to the predefined pressure setpoint value should be completed before the dosing process starts, that is, before medium within the dosing device is moved.

When an overpressure prevails within the pressure vessel in relation to the environment of the dosing device, the pressurizing gas pushes the first medium towards the dosing tip and, if required, out of the dosing tip if first medium is to be dispensed.

The pressure upstream of the pressure regulator may be provided, for example, by means of a pump or also by means of a pressure reservoir, for example a gas cylinder. In any case, a direct action of a pump on the first medium is avoided.

The pressurizing gas used may be air, for example, but also a suitable inert gas, such as nitrogen or argon.

All of the internal components of the dosing device come into contact exclusively with the first medium and, if required, with the pressurizing gas. However, the pressurizing gas never enters the flow meter, so that always only the flow of first medium is registered.

The dosing device can therefore be designed in a simple manner such that no contamination by different media occurs, which is why, for example, the dosing valve can be designed for multiple use. It is also not necessary to employ disposable pumps.

The dosing tip may also be used several times if required. Since a pressure differential is always made use of for dispensing, dispensing can be effected in a contactless manner. The dosing tip therefore need not be immersed in a medium already present in the receiving container during dispensing, so that contamination is avoided here as well.

It is also conceivable, for example, to clean the dosing tip and remove residues by flushing with first medium. In this way, the dosing tip also need not necessarily be replaced after each process.

Using the flow meter, the moving quantity of first medium can be measured directly, which is possible with a high degree of accuracy both for a movement towards the dosing tip and away from the dosing tip.

It has been found that such a dosing device allows a very precise dosing with a short process time.

The dosing device is can be designed such that the predefined pressure setpoint value of the internal pressure in the pressure vessel can assume a negative pressure that moves the first medium away from the dosing tip and aspirates a second liquid medium into the dosing tip.

When there is a negative pressure in the pressure vessel compared to the environment of the dosing device, the first medium is sucked away from the dosing tip and towards the pressure vessel. In the process, a second medium can be aspirated through the outlet end of the dosing tip and into the dosing tip, if required.

The negative pressure and overpressure values that can be generated in the pressure vessel should be selected to be large enough here to provide sufficient kinetic energy to move (dispense) the first medium out of the dosing tip by means of an overpressure in such quantities as is the case in normal dosing processes. Quantities of about 1 μl to 50 μl can be dispensed in this process. In the case of a movement in the opposite direction caused by a negative pressure in the pressure vessel, a quantity of first medium of the same order of magnitude should be movable.

For this purpose, for example, the pressure inside the pressure vessel may be adjustable between 20 mbar (20 hPa) and 3 bar (3000 hPa), in particular between 500 mbar (500 hPa) and 3 bar (3000 hPa). Thus, for example, a relative pressure difference in relation to the environment of the dosing device of, e.g., a negative pressure of 500 hPa to an overpressure of 2000 hPa can be preset.

In principle, the dosing device can be operated in different modes.

For one thing, the first medium may be employed as a process medium. A process medium is a medium that is used as a reagent in a process, e.g., in a diagnostic procedure or a manufacturing method. In this case, the first medium is dispensed via the dosing tip in desired amounts, for example, into a sample container or for use in specified processes.

In another mode, the first medium delivered out of the dosing tip can perform a flushing or cleaning step in which, in particular, the dosing tip is flushed out and cleaned of residues. In this case, the first medium is used as a flushing or cleaning solution.

In a further mode, the first medium can be used as a system medium or generally as a control medium and can both suck in a second medium via the dosing tip in a movement driven by a negative pressure, so that the second medium is aspirated into the dosing tip, and can also dispense the second medium again via the dosing tip in a movement driven by an overpressure.

In this mode, the first medium is used exclusively for moving the second medium.

The second medium may come into contact exclusively with the dosing tip, i.e. it is not moved into conduit sections of the dosing device and in particular not into the dosing valve or upstream of the dosing valve. In this way, no contamination of other components of the dosing device by the second medium can occur, since only the first medium is moved there.

The second medium is e.g. a process medium, but could also be a flushing or cleaning solution if desired.

Dispensing of the second medium as a process medium may take place into a suitable sample container, as is conventionally known, wherein the second medium aspirated into the dosing tip can be transported to the desired dispensing point by means of the dosing tip.

If the first medium also serves as a system or control medium, a liquid with well known parameters (for example, viscosity, density and behavior in the case of temperature changes) is advantageously used. For example, distilled water, alcohols or suitable oils may be considered here. It is possible that a liquid is selected that is both suitable as a system medium and required as a process medium in the processes for which the dosing device is to be employed.

It is also conceivable to operate the dosing device successively with different first media, the respective first medium being matched to the current intended use.

The dosing device may include a control unit, which can be designed either as an internal electronic unit or as an external unit, wherein the external unit can be implemented in any desired system and should be adapted to be connected to the dosing device via a suitable interface.

Parameters of the first medium are stored in the control unit, also for different first media if required, so that the properties of the first medium under different conditions, for example different temperatures, can be retrieved. This data can be utilized to select the predefined pressure setpoint value of the internal pressure and thus to adjust the internal pressure of the pressure vessel in such a way that the desired movement of the first medium in the dosing device is achieved. In addition, the control unit advantageously has data of the components of the dosing device at its disposal, e.g. characteristic curves of the pressure regulator, flow meter and dosing valve, which can be included in the calculation of the pressure setpoint value.

In addition to the properties of the first medium itself, the moving amount of first medium is determined by the internal pressure set by means of the pressure regulator and also by a switching time interval of the dosing valve, which specifies a period of time for which the dosing valve is open.

The flow meter usually measures a moving volume of the first medium. If the dosing to be performed is to be carried out with regard to other properties, for example mass or amount of substance, the control unit can take this into account accordingly in the specification of the settings. In this respect, the terms “amount” or “quantity” and “volume” are used as synonyms in the present application.

These specifications can be determined by the control unit. The control unit is designed, for example, such that it addresses the pressure regulator and the dosing valve and can operate them in a closed loop control system.

The dosing valve is e.g. a solenoid valve in which the drive is separated from the medium, for example by a diaphragm, so that the first medium is prevented from coming into contact with drive components of the valve.

The dosing quantities may be selected very flexibly for both dispensing and aspiration.

If first medium is to be dispensed, quantities exceeding the maximum filling quantity of the dosing tip can also be dispensed.

In general, it is of course possible to dispense an aspirated quantity of second medium in several, smaller quantities.

The aspiration of second medium is carried out from a container that is separate from or separable from the dosing device, for example a storage container. Here, the second medium does not experience any contact with other components apart from the dosing tip.

In the dispensing process, the second medium may be delivered, for example, into a specific sample container that can be connected to the dosing device, if required.

To prevent contact between the first and the second medium, a separation aid can be provided in the dosing tip, which consists of a separation medium aspirated into the dosing tip or a movable separating element inserted into the dosing tip.

For example, before aspiration of the second medium, separation medium can first be taken up into the dosing tip by applying a negative pressure in the pressure vessel (and generally always during dispensing and aspiration, of course, by opening the dosing valve) and then the second medium can be aspirated. As a result, the second medium is held at a distance from the first medium in the dosing tip by the separation medium, and no mixing of the second medium with the first medium can occur.

When the second medium is aspirated, the separation medium is moved away from the outlet end of the dosing tip in the same way as the first medium.

By analogy, the separating element prevents contact between the media.

As the separation medium, a fluid should of course be selected that will not mix with either of the two media used. Here, depending on the first and second media, an oil often comes into consideration if both media are aqueous solutions. But it is also possible to use air as a separation medium, in particular if the inside diameter of the dosing tip is so small that capillary forces act here and thus an air bubble remains at the desired place.

If a structural separating element is used, it may comprise, for example, a piston having a sealing disk which is arranged in a widened portion of the dosing tip directed away from an outlet end of the dosing tip and rests against an inner wall of the dosing tip, and a rod which projects perpendicularly from the sealing disk and protrudes into a narrower portion of the dosing tip adjoining the widened portion towards the outlet end.

The rod here serves to guide the separating element and to correctly position the sealing disk, while the sealing disk produces a seal against the first medium.

In doing so, the rod may protrude into the narrower portion without contacting the inner wall of the dosing tip.

The second medium is taken up into the space between the outlet end of the dosing tip and the sealing disk, with the sealing disk moving away from the outlet end due to the applied negative pressure in order to suck in the second medium, and moving towards the outlet end in order to dispense the taken-up second medium again.

It would also be conceivable to use a diaphragm firmly connected to the inner wall of the dosing tip as the separating element, with the diaphragm expanding away from the outlet end when second medium is aspirated and moving toward the outlet end to dispense second medium.

Of course, the second medium should be aspirated into the dosing device only so far that it will not leave the dosing tip and, in particular, will not come into contact with fluid conduits of the dosing device proper and will also not reach the area of the dosing valve or of the flow meter.

It is possible to provide a single pressure vessel for generating the pressure differential, which is connected to a single pressure regulator, wherein in the pressure vessel both a negative pressure and an overpressure (in each case relative to the environment of the dosing device) can be applied to the pressurizing gas, that is, a negative pressure or an overpressure can be selected for the predefined pressure setpoint value of the internal pressure.

In another possible variant, two pressure vessels are provided in each of which a pressurizing gas is present, wherein in one of the pressure vessels, the predefined pressure setpoint value of the internal pressure can be set, in particular permanently, as a negative pressure relative to the environment of the dosing device, and in the other pressure vessel the predefined pressure setpoint value of the internal pressure can be set, in particular permanently, as an overpressure relative to the environment of the dosing device. This shortens the process times, since a respective reservoir is available for a positive pressure and for a negative pressure at all times, that can act on the first medium.

In order to apply the appropriate pressure to the first medium, a switching valve is provided between the pressure vessels and the flow meter, which can place each of the pressure vessels into fluid communication with the flow meter. The switching valve is e.g. a 3/2-way valve.

Each of the two pressure vessels includes a pressure regulator of its own and may also have its own pressure supply, for example a pump.

In the simplest case, a proportion of first medium is also present in the pressure vessel in each case in addition to the pressurizing gas, so that the internal pressure prevailing in the pressure vessel is transmitted directly to the first medium. This internal pressure applied then prevails in principle in the entire fluid conduit between the pressure vessel and the dosing tip.

If two pressure vessels are provided, both pressure vessels may also contain a quantity of first medium in addition to the pressurizing gas, with the internal pressure being directly passed on to the first medium.

However, it is also possible to provide an equalizing tank which is arranged downstream of the pressure vessels and is adapted to be placed in fluid communication with each of the two pressure vessels and in which a part of the first medium is held. The desired internal pressure in the equalizing tank is provided by a suitable position of the switching valve and a suitable selection of the predefined pressure setpoint value of the internal pressure in the respective pressure vessel, the internal pressure in the equalizing tank acting directly on the first medium located in the equalizing tank.

The predefined pressure setpoint value of the internal pressure is specified here by the control unit such that the quantity of first medium necessary for the intended dosing operations can be moved.

The desired internal pressure can be preset before the dosing valve is opened. This allows a faster process time and exact dosing to be achieved.

The equalizing tank may be employed as a reservoir for the first medium, so that larger quantities of the first medium can also be kept available already at the desired pressure. This is especially interesting for process steps in which larger quantities of first medium are needed, for example for flushing the dosing tip by dispensing first medium.

If an equalizing tank is present, both pressure vessels may exclusively contain pressurizing gas, while the equalizing tank contains both pressurizing gas and first medium.

In general, the fluid-conducting section of the dosing device is structured linearly starting from the pressure vessel or, in the case of two pressure vessels, from the switching valve, with the pressure vessel or vessels being located upstream of the switching valve, which may be located upstream of an equalizing tank, which, downstream, is adjoined linearly by the flow meter, the dosing valve and the dosing tip. Any further components and branches may be dispensed with completely if desired.

The above-mentioned object is also achieved by a method of dosing at least one liquid medium by means of a dosing device as described above. Here, an internal pressure of at least one pressure vessel is set to the predefined pressure setpoint value, and the first medium within the dosing device is moved by means of a pressure differential between the internal pressure and an environment of the dosing device, and the moving quantity of the first medium is measured by means of the flow meter, which is fluidically arranged between the dosing tip and the pressure vessel. Therefore, no direct action of a pump on the first medium and, if applicable, the second medium is necessary. Furthermore, a direct measurement of the moving quantity of first medium is performed, which constitutes a direct measure of both a quantity of dispensed first medium and a quantity of aspirated or dispensed second medium. This allows a high degree of precision of dosing to be achieved.

As already discussed above, the first medium may be moved in the direction towards the dosing tip and in the direction away from the dosing tip by selecting the pressure value as an overpressure or a negative pressure, respectively.

The predefined pressure setpoint value and the internal pressure are e.g. kept constant during the dosing process, that is, while the first medium is being moved, and the internal pressure is set to the predefined pressure setpoint value before the dosing process is started.

In one possible method, a second liquid medium is aspirated through the dosing tip and subsequently dispensed again through the dosing tip.

The second liquid medium can be aspirated through the dosing tip from a storage container, for example, and subsequently dispensed through the dosing tip into a sample container, for example, when the second medium is used as a process medium.

Here, the aspiration of the second medium is e.g. effected by selecting a negative pressure for the predefined pressure setpoint value of the internal pressure in at least one pressure vessel and, resulting therefrom, by a movement of first medium away from the dosing tip.

To prevent contact of the first medium with the second medium, a separation medium may be aspirated through the dosing tip as a separation aid prior to the aspiration of the second medium, the separation medium then being located between the first and second media. Alternatively, a separating element inserted in the dosing tip may be moved. In either case, the separation aid prevents contact between the two media.

A dosing, i.e. the dispensing or aspirating of a predefined quantity of first medium to be dispensed or a predefined quantity of second medium to be aspirated or to be dispensed, can be easily set by means of a pressure-time control, wherein before the start of the dosing process a pressure setpoint value is adjusted by means of the internal pressure within the pressure vessel and a quantity of the first medium moved within a switching time interval is measured.

The internal pressure prevailing in the pressure vessel(s) or in the equalizing tank as well as the switching time interval during which the dosing valve is open unequivocally determine the quantity of first medium passing the flow meter. The value output by the flow meter is therefore directly proportional to the dispensed quantity of first fluid or to the aspirated or dispensed quantity of second fluid.

The pressure regulator is used to set the internal pressure in the pressure vessel or vessels to the pressure setpoint value, e.g. prior to the start of dosing. The controller then determines a switching time interval during which the dosing valve is opened.

After the specified switching time interval has elapsed, the dosing valve is closed and the rate of flow measured by the flow meter is compared with the moving quantity of first medium desired for this dosing process. If there is a deviation, the switching time interval is reduced or extended and/or the pressure setpoint value is changed.

In the next dosing step, the movement of the first medium is performed accordingly using the newly specified switching time interval and/or pressure setpoint.

This means that in order to check whether the switching time interval and the pressure setpoint value are correctly predefined, at least one dosing process may be provided in which only a partial quantity of the total quantity of the first medium to be moved is moved, wherein after this dosing process a deviation of the quantity moved in this dosing process from a predefined quantity to be moved is determined and the switching time interval for a subsequent dosing process is adapted. In so doing, the switching time interval for the next dosing process is adapted such that the deviation is decreased and can be reduced to zero.

It is possible to carry out one or more such dosing processes using a test quantity before starting the actual dosing, in order to check the correct setting outside the dosing process in the actual process and to readjust it if necessary.

Since the deviation becomes smaller and smaller as the number of corrected dosing processes increases, very exact dosing can be achieved in this way.

DETAILED DESCRIPTION

Figure 1:
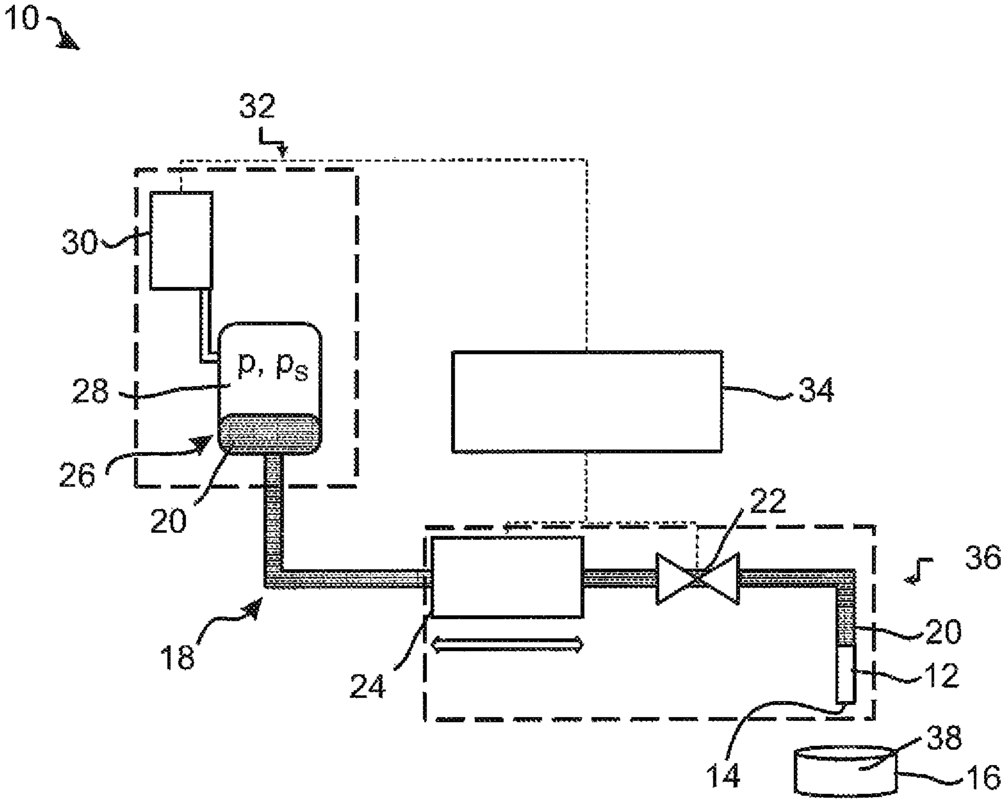
FIG. 1 shows a schematic representation of a dosing device according to a first embodiment of the invention.

FIG. 1 shows a dosing device 10 according to a first embodiment.

The dosing device 10 is used to precisely dose extremely small quantities of liquids (for example in the range of from 1 μl to 50 μl). To do so, the liquid is pressed out of a dosing tip 12 (see also FIGS. 4 and 5) so that it exits at an outlet end 14 of the dosing tip 12 and enters a suitable container 16, for example a sample container.

In these examples, dosing into the container 16 is performed in a contactless manner, i.e., the outlet end 14 of the dosing tip 12 touches neither the container 16 nor a medium present in this container 16.

The container 16 may be configured to be inserted into the dosing device 10, but is generally separable from the dosing device 10. In addition, in principle, the dosing tip 12 can cooperate with different containers.

Inside the dosing device 10, a first liquid medium 20 is located in a fluid conduit system 18.

Here, the first medium 20 is a liquid the properties of which are well known and which, in this example, may also be made use of as a process medium or as a flushing or cleaning solution. For example, distilled water, alcohols or particular oils come into consideration here.

The fluid conduit system 18 is composed of all of the fluid carrying components of the dosing device 10.

In this example, the fluid conduit system 18 is linear in structure, with a dosing valve 22 being arranged upstream of the dosing tip 12, the dosing valve 22 in turn being followed upstream by a flow meter 24, from which a conduit section runs to an upstream pressure vessel 26.

The dosing valve 22 is a solenoid valve here, the drive unit of which is partitioned off from the fluid-carrying areas, for example by a diaphragm, so that the first medium 20 will not come into contact with the drive components of the dosing valve 22 when it flows through the dosing valve 22.

When the dosing valve 22 is open, first medium 20 can flow through the dosing valve 22 toward the dosing tip 12 and in the opposite direction. When the dosing valve 22 is closed, the first medium 20 cannot move through the dosing valve 22.

Due to the capillary forces which act in the fluid conduits and the dosing tip 12 and which are caused by the small cross-section, a quantity of first medium 20 located between the outlet end 14 of the dosing tip 12 and the dosing valve 22 will generally not flow out of the dosing tip 12.

The flow meter 24 may be configured as desired, but it is essential that it be able to capture or register the passage of quantities of liquid e.g. smaller than 1 μl in either direction.

In the pressure vessel 26, part of the volume is filled with a pressurizing gas 28, which may be air or an inert gas, for example. The remaining volume is filled with first medium 20.

The pressure vessel 26 is in fluid communication with a pressure regulator 30, which is capable of setting the internal pressure p in the pressure vessel 26 to a predefined pressure setpoint value $p_S$ over a wide pressure range. To this end, the pressure regulator 30 is connected to a pressure source (not illustrated), for example a pump or a compressed gas accumulator.

In this example, the predefined pressure setpoint value $p_S$ of the internal pressure p can be selected to be between about 20 mbar (20 hPa), possibly 500 mbar (500 hPa), and 3 bar (3000 hPa), so that the internal pressure p can be set to any desired value within these limits. The internal pressure p can thus assume both a marked negative pressure compared to the environment of the dosing device 10 and a marked overpressure compared to the environment of the dosing device 10.

In all examples described herein, the internal pressure p in the pressure vessel 26 remains constant during a dosing process, so that the pressure differential used to move the first medium 20 also remains constant.

The pressure regulator 30 may be made use of for this purpose, for example, but it is also possible to select the volume of the pressure vessel 26 to be large enough in comparison to the volume of the conduits of the dosing device 10 for the pressure vessel 26 to provide a sufficiently large reservoir to keep the internal pressure p constant for all practical purposes for the duration of a dosing process even without readjustment.

The pressure vessel 26 and the pressure regulator 30 here are part of a pressure control unit 32, which is structurally designed, e.g., as a component of the dosing device 10.

A control unit 34 is connected to the pressure regulator 30 and can exchange data with it and provide instructions to the pressure regulator 30.

The control unit 34 may be integrated into the dosing device 10, but may also be implemented externally and be connected to the dosing device 10 wirelessly or via a data line using a suitable interface.

The flow meter 24, the dosing valve 22 and the dosing tip 12 are part of a dosing unit 36, which may form a further structural component of the dosing device 10. An interface between the pressure control unit 32 and the dosing unit 36 is implemented, for example, by an outlet of the pressure vessel 26 and an inlet of the flow meter 24.

The control unit 34 is also connected to the flow meter 24 and the dosing valve 22, and in particular receives flow measurement values from the flow meter 24 and specifies a switching time interval $t_I$ for the dosing valve 22, which determines a period of time for which the dosing valve 22 is open during the dosing process.

The dosing device 10 can be operated in several different modes.

In a first mode, first medium 20 can be delivered, i.e. dispensed, through the dosing tip 12.

To this end, an overpressure $p_Ü$ is specified for the pressure setpoint value $p_S$ and the internal pressure p in the pressure vessel 26 is set accordingly to an overpressure that is high enough to overcome the flow resistance of the fluid conduit system 18 in relation to the ambient pressure of the dosing device 10, and the dosing valve 22 is opened. The pressurizing gas 28, which is under pressure p, therefore moves the first medium 20 toward and out of the dosing tip 12.

Figure 6:
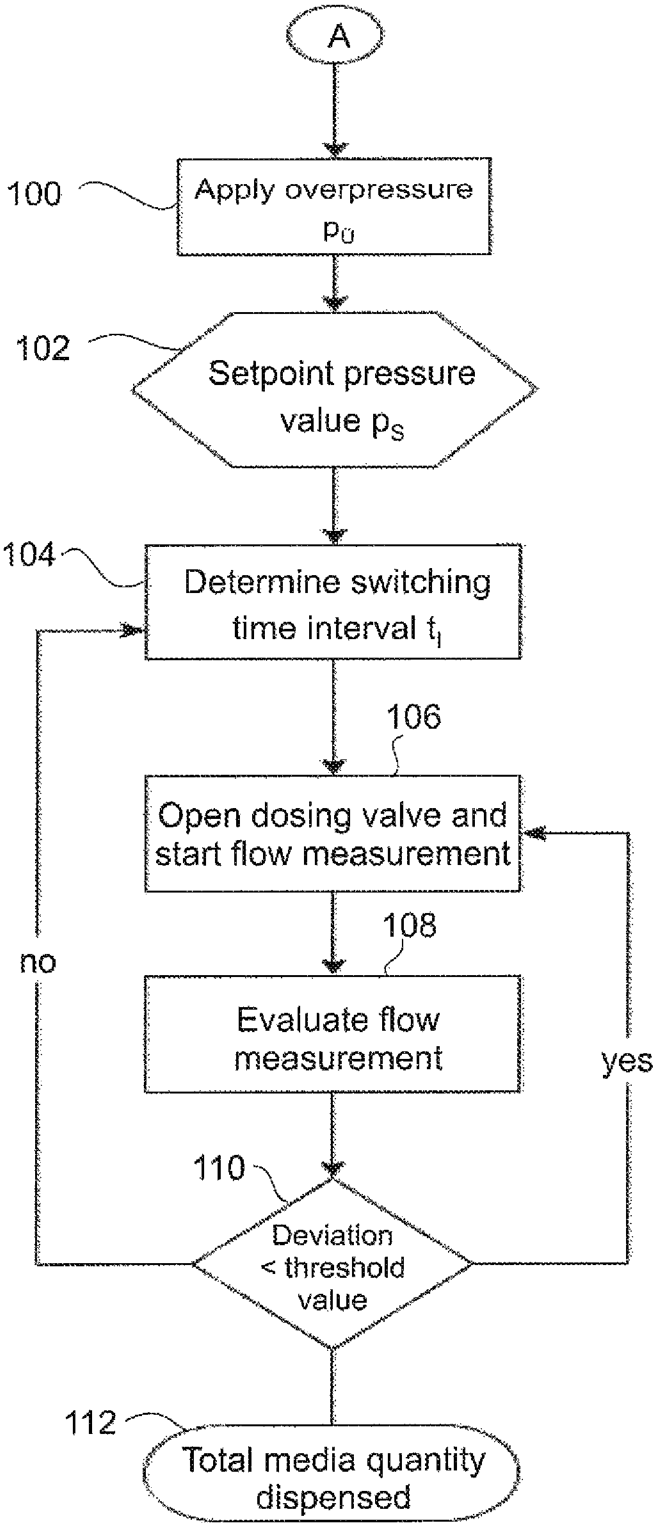
FIGS. 6 to 8 show schematic flow diagrams for dosing methods according to the invention for implementation with a dosing device according to the invention.

FIG. 6 shows an example of a pressure-time controlled dosing method for the dispensing of medium, e.g. of first medium 20 (method A).

First, the pressure regulator 30 sets the internal pressure p to a predefined pressure setpoint value $p_S$, which is transmitted by the control unit 34, for example, and which defines an overpressure $p_Ü$ in relation to the environment (steps 100 and 102).

Based on the setpoint pressure value $p_S$ (which now corresponds to the internal pressure p in the pressure vessel 26), the total quantity of medium to be dispensed and other parameters, for example the current temperature, the viscosity of the first medium 20 and its density, the control unit 34 calculates a switching time interval $t_I$ which indicates the period of time for which the dosing valve 22 is to be open in order to dispense the desired amount of medium (step 104).

Simultaneously with the opening of the dosing valve 22, the measurement of the flow rate at the flow meter 24 is started (step 106).

After the switching time interval $t_I$ has elapsed, the dosing valve 22 is closed again and the measurement data of the flow meter 24 are transmitted to the control unit 34. The control unit evaluates the measurement and determines a deviation between the quantity of first medium 20 that has flowed through as ascertained by the flow meter 24 and the predefined partial quantity to be dispensed (step 108).

If the deviation is smaller than a predefined threshold value, the dosing will be continued with the existing values for the pressure setpoint value $p_S$ and the switching time interval $t_I$ for the next dosing process.

If the deviation is above the threshold value, the switching time interval $t_I$ and/or the pressure setpoint value $p_S$ are adapted for the subsequent dosing process (step 110).

Since the deviation becomes smaller with repeated passes through this closed loop control system, in most cases the dose dispensed will have been set to the desired value after a few dosing processes. It is possible to dispose of the medium 20 dispensed in these dosing processes used for setting and only employ the medium 20 for the actual process in step 112 when the deviation is sufficiently small.

It is possible to perform a check as described above also during dispensing of the total amount.

In a further mode, a second medium 38 can be aspirated into the dosing tip 12 from an external container (for example, the container 16 in FIG. 1). This is outlined as method B in FIG. 7.

To this end, a pressure setpoint value $p_S$ that corresponds to a negative pressure $p_U$ in relation to the environment of the dosing device 10 is specified by means of the pressure regulator 30 (steps 101 and 102).

As in the example just described, the control unit 34 determines a switching time interval $t_I$ for the dosing process, which opens the dosing valve 22 until the quantity to be dosed of first medium 20 has flowed through the flow meter 24 (step 104).

In this case, the first medium 20 flows away from the dosing tip 12 and toward the pressure vessel 26 when the dosing valve 22 is opened. This produces a negative pressure at the outlet end 14 of the dosing tip 12, which sucks (aspirates) the second medium 38 into the dosing tip 12.

In this case, the first medium 20 acts purely as a system or control medium to move the second medium 38.

The remaining steps 106 to 112 are performed as described above for the dispensing process.

A dosing process takes about 10 ms, for example.

Figure 7:
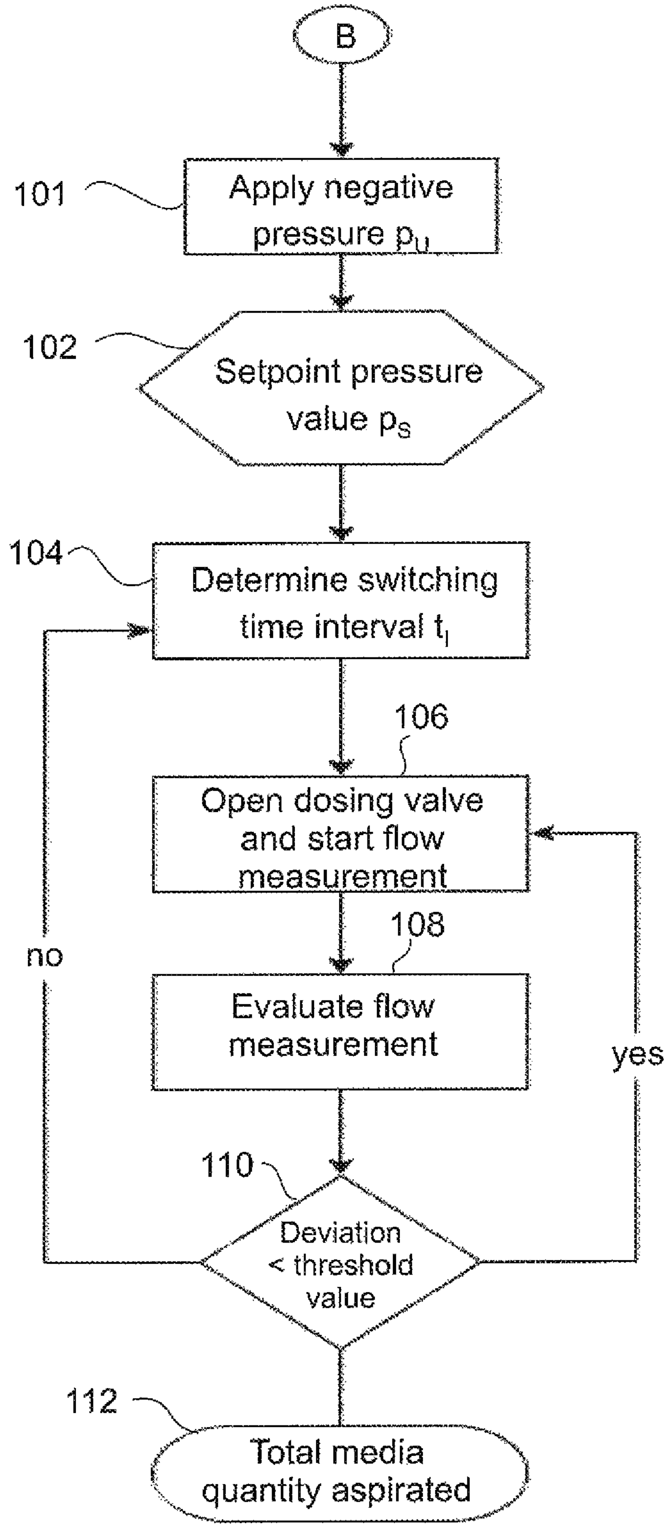

In the examples of FIGS. 6 and 7, only the switching time interval $t_I$ is adjusted, while the pressure setpoint value $p_S$ remains unchanged. But it would be possible in all cases with the same result to also or exclusively change the pressure setpoint value $p_S$.

To prevent mixing of the first medium 20 with the second medium 38 and thus contamination of both the second medium 38 and the dosing device 10, a separation aid is used here.

Figure 4:
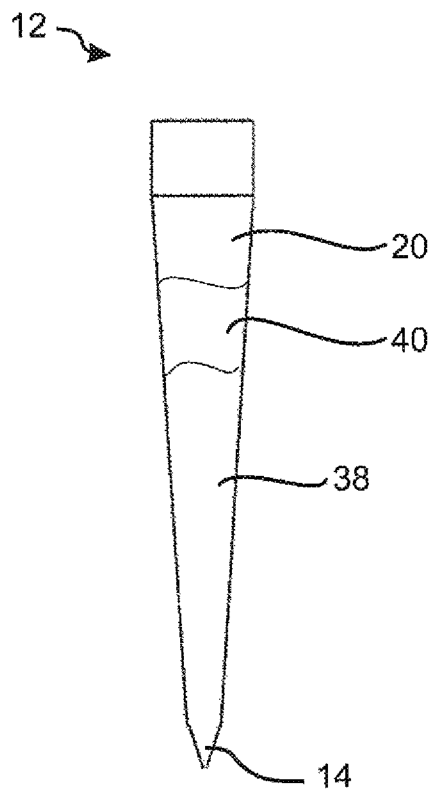
FIGS. 4 and 5 show dosing tips for a dosing device according to the invention.

In one possible variant, a separation medium 40 is aspirated as a separation aid before the second medium 38 is aspirated. The result is depicted in FIG. 4. A small amount of the separation medium 40 is present between the first medium 20 and the second medium 38 and prevents contact between the two media 20, 38.

The separation medium 40 used may be, for example, a suitable liquid that is not miscible with either of the two media 20, 38, or, due to capillary forces, simply an air bubble.

The separation medium 40 is taken up from a separate container (not shown) (or, in the case of air, from the environment) before the dosing tip 12 is brought into contact with the second medium 38.

Figure 5:
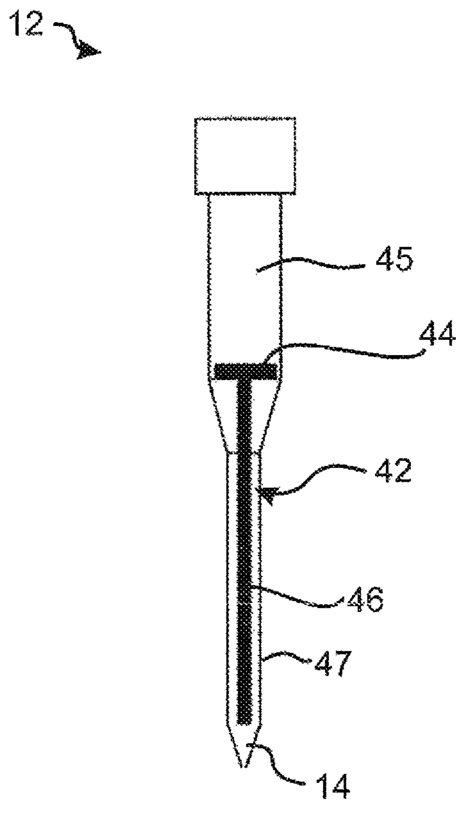

In an alternative variant, which is illustrated in FIG. 5, a separating element 42 is accommodated in the dosing tip 12 as a separation aid and is configured here in the form of a piston which includes, at its end remote from the outlet end 14, a sealing disk 44 from which a rod 46 projects perpendicularly toward the outlet end 14, which rod 46 is not in contact with an inner wall of the dosing tip 12 and which serves as a guide for the sealing disk 44 in order to keep the latter in sealing contact with the inner wall.

In this example, the sealing disk 44 is arranged in a widened portion 45 of the dosing tip 12, while the rod 46 protrudes into a narrower portion 47.

The sealing disk 44 separates the first medium 20 from the second medium 38, with the separating element 42 shifting within the dosing tip 12 as a result of the movement of the first medium 20.

To again dispense the second medium 38 now located in the lower portion of the dosing tip 12, the method A described above and illustrated in FIG. 6 is carried out again.

It is possible to aspirate a larger quantity of second medium 38 and to dispense it again in smaller quantities, for example, to take up 25 μl into the dosing tip 12 and to dispense 1 μl each in 25 individual dosages.

A process medium that is used as a reagent, for example in a diagnostic procedure or a manufacturing method, is usually employed as the second medium 38.

Of course, different second media 38 may be aspirated and dispensed successively by the dosing device 10.

Alternatively or additionally, a flushing or cleaning solution could also be used as the second medium 38.

The first medium 20, in contrast, can either be used purely as a system or control medium for moving the second medium 38 or can also be dispensed as a process medium. Here, the first medium 20 is furthermore used as a flushing or cleaning solution, for which purpose it is discharged through the dosing tip 12 in order to remove residues therefrom.

Figure 8:
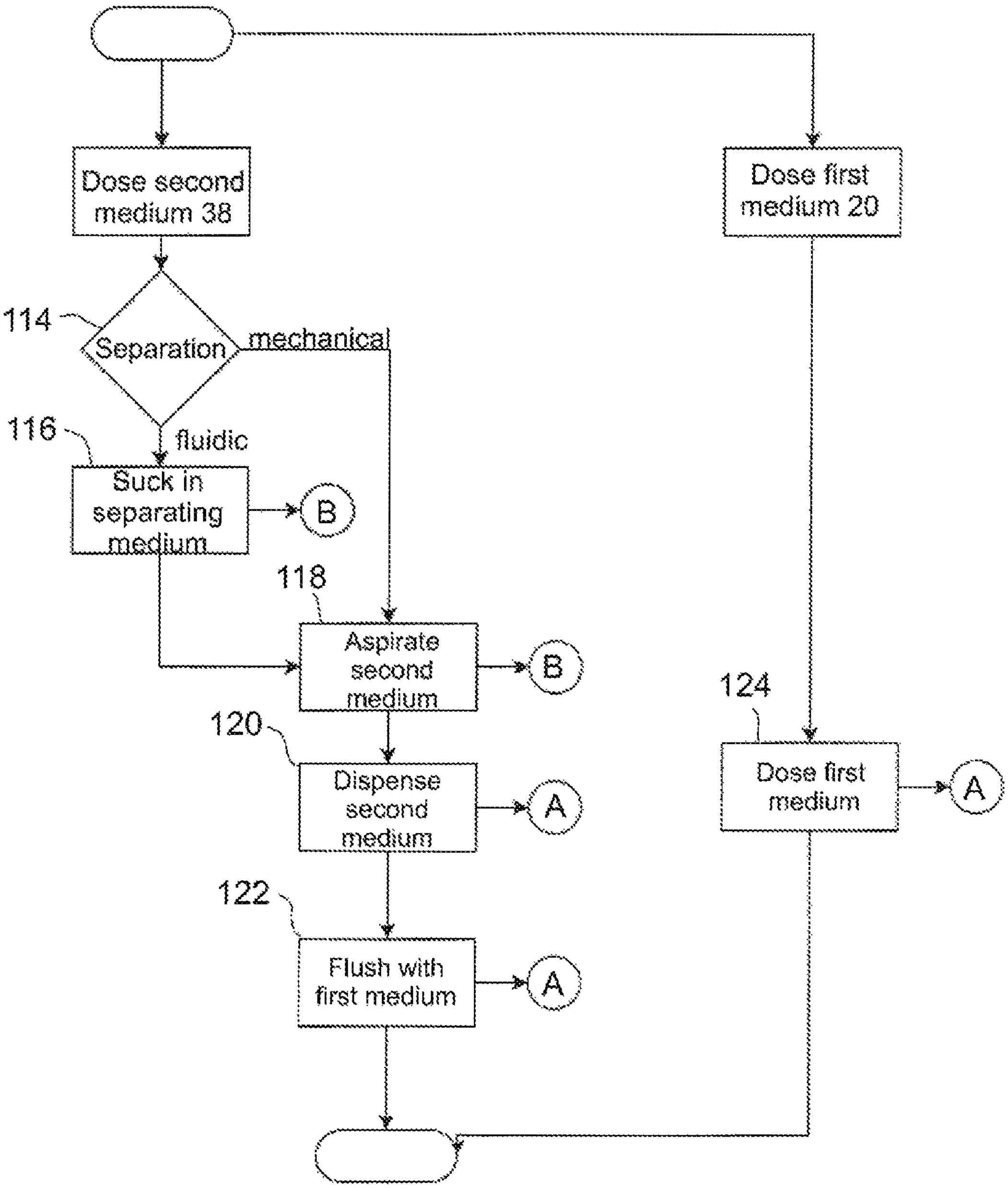

FIG. 8 shows the flexibility of the dosing device 10 using several possible methods. It is illustrated here to dose either first medium 20 or second medium 38.

If only first medium 20 is to be dispensed, the method A according to FIG. 6 is carried out in step 124.

If second medium 38 is to be dispensed, a separation aid, either a mechanical separating element 42 or a separation medium 40, is first introduced into the dosing tip 12 (step 114). If a separation medium 40 is to be used (step 116), it is taken up into the dosing tip 12 by means of the steps of the method B in FIG. 7.

Then the required amount of second medium 38 is aspirated (step 118), which is again carried out by means of the method B in FIG. 7.

Subsequently, in step 120, the second medium 38 is dosed, i.e. dispensed, using the method A from FIG. 6.

Finally, a flushing step 122 using first medium 20 may be performed, in which the remainder of the second medium 38 is removed from the dosing tip 12 and residues are eliminated. For this purpose, the method A of FIG. 6 is carried out with first medium 20 only, without first taking up second medium 38.

Process sequences other than those shown and described here are, of course, also conceivable; these possible processes are mentioned only by way of example.

If separation medium 40 is aspirated or the dosing tip 12 is flushed with first medium 20, this can be effected with low accuracy and therefore less time required.

Figure 2:
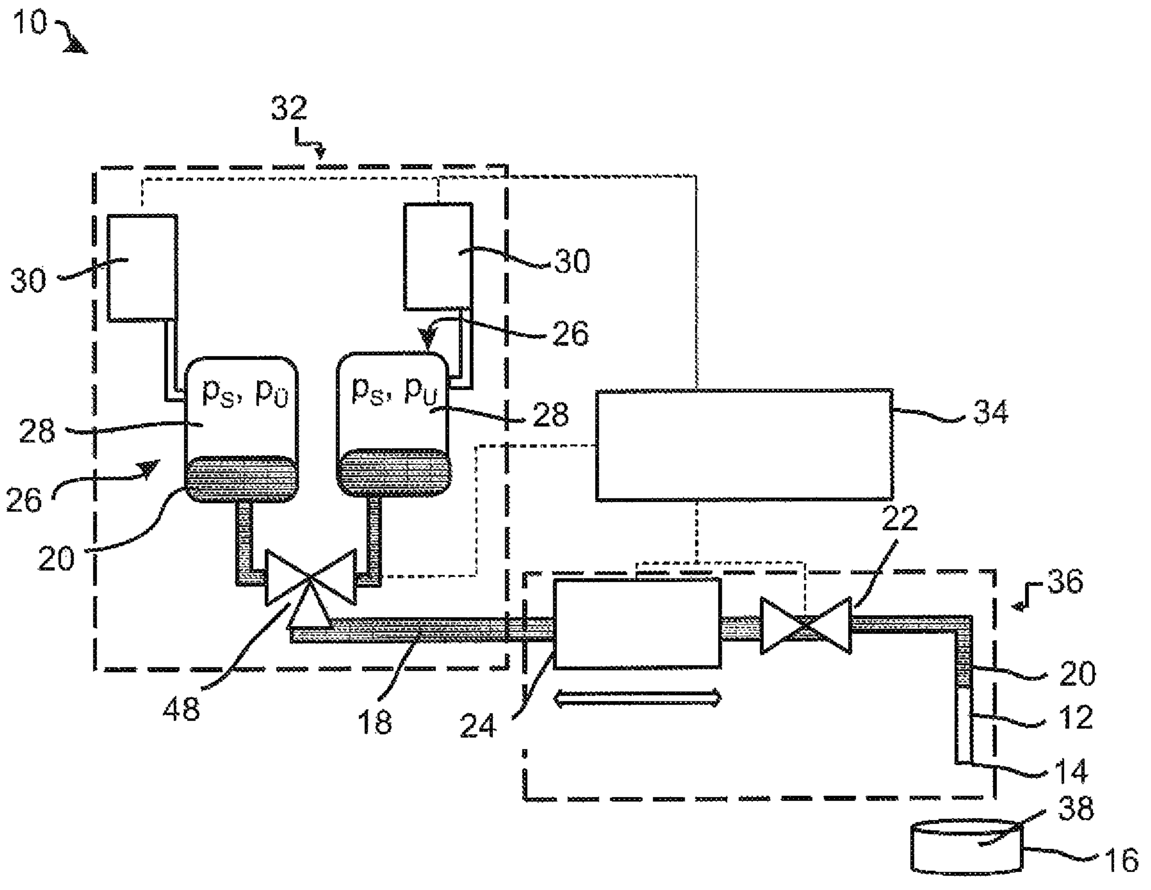
FIG. 2 shows a schematic representation of a dosing device according to a second embodiment of the invention.

FIG. 2 shows a second embodiment of the dosing device 10, which is likewise suitable for carrying out all of the methods described above.

The only difference from the first embodiment is that two pressure vessels 26 are provided here, each of which cooperates with a pressure regulator 30 of its own, with the internal pressure p of one pressure vessel 26 being permanently set to an overpressure $p_Ü$ and that of the other pressure vessel 26 being permanently set to a negative pressure $p_U$. In this way, the changeover between dispensing and aspirating can be carried out faster, since the pressure vessel 26 does not first have to be changed over from overpressure to negative pressure or vice versa. Before starting a dosing process, e.g., the internal pressure p of one of the pressure vessels 26 is set to the predefined pressure setpoint value $p_S$, wherein in each case only the level of overpressure or negative pressure needs to be adjusted.

In this example, both pressure vessels 26 contain both pressurizing gas 28 and first medium 20.

Here, the two pressure vessels 26 are connected with the inlet of the flow meter 24 by means of a 3/2-way switching valve 48, if required by a pipe that is part of the fluid conduit system 18.

To apply the desired pressure to the fluid conduits of the dosing device 10, the switching valve 48 is placed in fluid communication with the respective pressure vessel 26 in which the pressure setpoint value $p_S$ is set.

Figure 3:
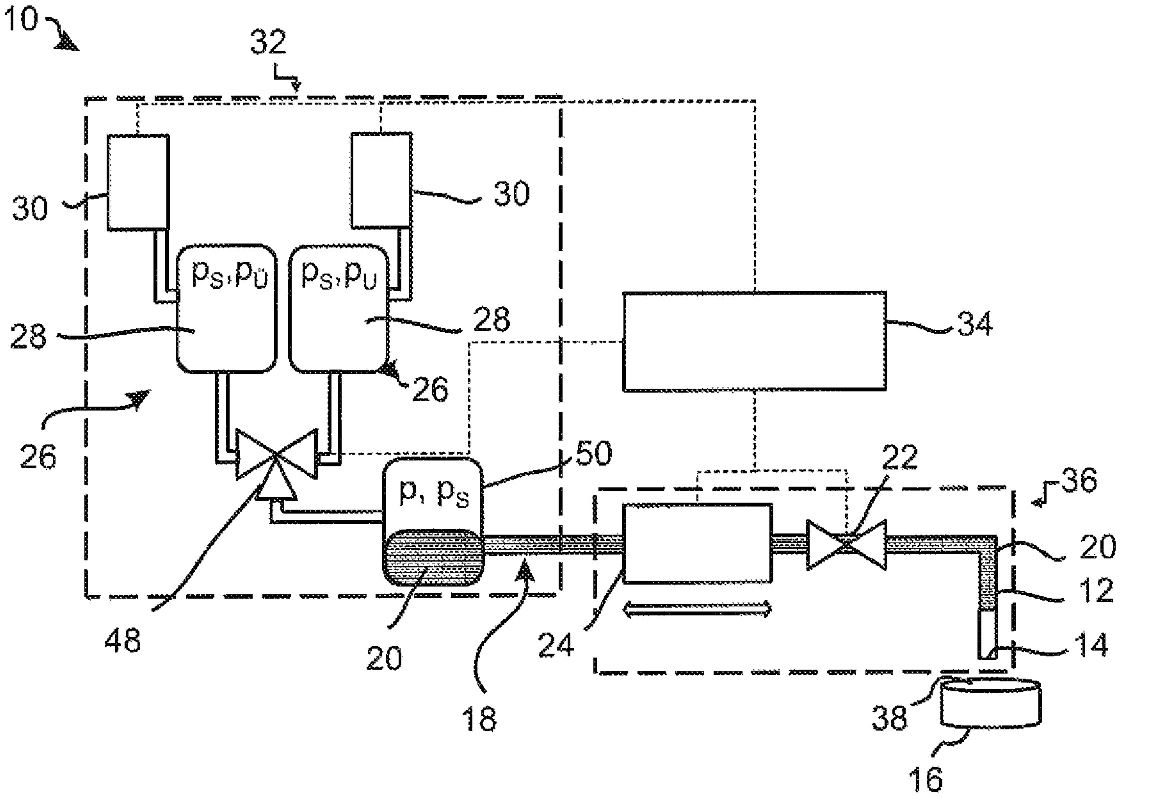
FIG. 3 shows a schematic representation of a dosing device according to a third embodiment of the invention.

FIG. 3 shows a third embodiment of the dosing device 10, which is likewise suitable for carrying out all of the methods described above.

In contrast to the embodiment just described, an equalizing tank 50 is arranged in the fluid conduit system 18 between the switching valve 48 and the flow meter 24 in addition to the two pressure vessels 26. The equalizing tank 50 holds both an amount of first medium 20 and pressurizing gas 28.

In this example, the two pressure vessels 26, which are connected with the equalizing tank 50 by means of the switching valve 48, contain exclusively pressurizing gas 28, but no first medium 20.

The presetting of the predefined pressure setpoint value $p_S$ is performed here by setting the internal pressure p in the equalizing tank 50 by means of the position of the switching valve 48 and the pressure values $p_Ü$, $p_U$ in the two pressure vessels 26, with pressurizing gas 28 flowing into the equalizing tank 50 from one of the pressure vessels 26 or flowing out of the equalizing tank 50 and into one of the pressure vessels 26, depending on the pressure setpoint value $p_S$ to be set.

This value can be checked, if desired, by means of a pressure sensor (not illustrated) within the equalizing tank 50.

The pressure transferred to the first medium 20 in the fluid conduit system 18 here corresponds to the internal pressure p in the equalizing tank 50, which therefore also acts as a pressure vessel.

The invention claimed is:

1. A dosing device, comprising:

a dosing tip for dispensing liquid medium; and at least one pressure vessel with a pressurizing gas, in which an internal pressure can be set by a pressure regulator to a predefined pressure setpoint value, which is an overpressure or a negative pressure relative to an environment of the dosing device, wherein the internal pressure is set by the pressurizing gas acting on a first liquid medium, a bidirectional flow meter that is designed to measure a quantity of the first medium that is moved by the internal pressure prevailing in the pressure vessel, and a dosing valve located upstream of the dosing tip and designed to enable or disable a flow of the first medium from the flow meter to the dosing tip; and a control unit connected to the flow meter and the dosing valve, the control unit being adapted to set a switching time interval during which the dosing valve is open, and to determine, in a dosing process, a deviation of a quantity of first medium moved during the switching time interval from a predefined quantity to be moved and to adapt the switching time interval for a subsequent dosing process.

2. A dosing device, comprising:

a dosing tip for dispensing liquid medium; and at least one pressure vessel with a pressurizing gas, in which an internal pressure can be set by a pressure regulator to a predefined pressure setpoint value, which is an overpressure or a negative pressure relative to an environment of the dosing device, wherein the internal pressure is set by the pressurizing gas acting on a first liquid medium, a bidirectional flow meter that is designed to measure a quantity of the first medium that is moved by the internal pressure prevailing in the pressure vessel, and a dosing valve located upstream of the dosing tip and designed to enable or disable a flow of the first medium from the flow meter to the dosing tip; and a control unit connected to the flow meter and the dosing valve, the control unit being adapted to set a switching time interval during which the dosing valve is open, and to determine, in a dosing process, a deviation of a quantity of first medium moved during the switching time interval from a predefined quantity to be moved and to adapt the switching time interval for a subsequent dosing process, wherein the predefined pressure setpoint value of the internal pressure in the pressure vessel can assume a negative pressure that moves the first medium away from the dosing tip and aspirates a second liquid medium into the dosing tip.

3. The dosing device according to claim 1, wherein a separation aid is present in the dosing tip, which consists of a separation medium aspirated into the dosing tip or a movable separating element inserted into the dosing tip.

4. The dosing device according to claim 3, wherein the separating element comprises a piston having a sealing disk that is arranged in a widened portion of the dosing tip directed away from an outlet end of the dosing tip and rests against an inner wall of the dosing tip, and a rod which projects perpendicularly from the sealing disk and protrudes into a narrower portion of the dosing tip adjoining the widened portion towards the outlet end.

5. The dosing device according to claim 1, further comprising two pressure vessels with pressurizing gas, wherein in one of the pressure vessels, the predefined pressure setpoint value of the internal pressure can be set as a negative pressure relative to the environment of the dosing device, and in the other pressure vessel, the predefined pressure setpoint value of the internal pressure can be set as an overpressure relative to the environment of the dosing device.

6. The dosing device according to claim 5, wherein a switching valve is arranged downstream of the pressure vessels and upstream of the flow meter.

7. The dosing device according to claim 5, wherein an equalizing tank is additionally provided downstream of the pressure vessels, which is adapted to be placed in fluid communication with each of the two pressure vessels and in which a part of the first medium is held.

8. The dosing device according to claim 7, wherein the pressurizing gas is exclusively present in both pressure vessels.

9. A method of dosing at least one liquid medium by a dosing device having a dosing tip for dispensing liquid medium and at least one pressure vessel with a pressurizing gas, in which an internal pressure can be set by a pressure regulator to a predefined pressure setpoint value, which is an overpressure or a negative pressure relative to an environment of the dosing device, wherein the internal pressure is set by the pressurizing gas acting on a first liquid medium, a bidirectional flow meter that is designed to measure a quantity of the first medium that is moved by the internal pressure prevailing in the pressure vessel, and a dosing valve located upstream of the dosing tip and designed to enable or disable a flow of the first medium from the flow meter to the dosing tip, the method comprising:

setting the internal pressure of at least one pressure vessel to the predefined pressure setpoint value;

moving the first medium within the dosing device by a pressure differential between the internal pressure and an environment of the dosing device; and measuring the moving quantity of the first medium by the flow meter, which is fluidically arranged between the dosing tip and the pressure vessel, wherein a dosing is performed by a pressure-time control, wherein before the start of a dosing process the pressure setpoint value is adjusted by the internal pressure within the pressure vessel and a quantity of the first medium moved within a switching time interval is measured, and wherein at least one dosing process is provided in which a partial quantity of the total quantity of the first medium to be moved is moved, wherein after this dosing process a deviation of the quantity moved in this dosing process from a predefined quantity to be moved is determined and the switching time interval is adapted for a subsequent dosing process.

10. The method according to claim 9, wherein a second liquid medium is aspirated through the dosing tip and subsequently dispensed through the dosing tip.

11. The method according to claim 9, wherein the aspiration of the second medium is affected by selecting a negative pressure for the predefined pressure setpoint value of the internal pressure in at least one pressure vessel and, resulting therefrom, by a movement of first medium away from the dosing tip.

12. The method according to claim 9, wherein, prior to the aspiration of the second medium, a separation medium is aspirated through the dosing tip as a separation aid, which is located between the first and second media, or a separating element inserted in the dosing tip is moved, the separation aid preventing contact between the two media.

* * * * *